(12) United States Patent
McLachlan et al.

(10) Patent No.: US 9,116,765 B2
(45) Date of Patent: Aug. 25, 2015

(54) SYSTEM AND METHOD FOR OBFUSCATING DATA USING INSTRUCTIONS AS A SOURCE OF PSEUDORANDOM VALUES

(75) Inventors: Jon McLachlan, San Francisco, CA (US); Gideon M. Myles, San Jose, CA (US); Julien Lerouge, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 518 days.

(21) Appl. No.: 13/308,515

(22) Filed: Nov. 30, 2011

(65) Prior Publication Data

US 2013/0104239 A1    Apr. 25, 2013

Related U.S. Application Data

(60) Provisional application No. 61/549,700, filed on Oct. 20, 2011.

(51) Int. Cl.
*H04L 29/00* (2006.01)
*G06F 7/58* (2006.01)
*G06F 21/54* (2013.01)

(52) U.S. Cl.
CPC .............. *G06F 7/588* (2013.01); *G06F 21/54* (2013.01); *G06F 2221/2107* (2013.01)

(58) Field of Classification Search
USPC .......................................... 713/153; 726/26
See application file for complete search history.

(56) References Cited

U.S. PATENT DOCUMENTS

| 6,570,988 | B1 | 5/2003 | Venkatesan et al. |
| 6,668,325 | B1 | 12/2003 | Collberg et al. |
| 6,978,358 | B2 | 12/2005 | Francis |
| 7,051,200 | B1 * | 5/2006 | Manferdelli et al. ......... 713/153 |
| 7,120,572 | B1 | 10/2006 | Liang |
| 7,620,987 | B2 | 11/2009 | Shelest |
| 7,823,135 | B2 | 10/2010 | Horning et al. |
| 7,904,892 | B2 | 3/2011 | Babb, II et al. |
| 2003/0142163 | A1 | 7/2003 | Nakayama et al. |
| 2004/0003264 | A1 | 1/2004 | Zeman et al. |
| 2004/0003278 | A1 | 1/2004 | Chen et al. |

(Continued)

OTHER PUBLICATIONS

/Louis J. Ricci/PROE:Pseudo Random Optimized Encryption/Jan. 1, 2007/pp. 1-128/.*

(Continued)

*Primary Examiner* — Brandon Hoffman
*Assistant Examiner* — Michael D Anderson
(74) *Attorney, Agent, or Firm* — Novak Druce Connolly Bove + Quigg LLP (57) ABSTRACT

Disclosed herein are systems, methods, and non-transitory computer-readable storage media for obfuscating data using instructions as a source of pseudorandom values. Obfuscation is performed by receiving instructions and data and compiling the instructions and the data into an executable file having a text section and a data section. The text section can include instructions and the data section can include data segments. The system obfuscates the data section iteratively by generating a hash of an address for a respective data segment, and based on the hash, identifying a corresponding address in the text section that includes at least one instruction. The system retrieves a mask key from the corresponding address and applies the mask key to the respective data segment, yielding a masked data segment. In one embodiment, integrity verification of obfuscated data is performed without exposing the data in an unprotected state by utilizing multiple mask keys.

21 Claims, 7 Drawing Sheets

(56) References Cited

U.S. PATENT DOCUMENTS

| | | | |
|---|---|---|---|
| 2005/0166191 A1 | 7/2005 | Kandanchatha et al. | |
| 2006/0187834 A1 | 8/2006 | Nichols et al. | |
| 2006/0291650 A1 | 12/2006 | Ananth | |
| 2007/0067606 A1 | 3/2007 | Lin et al. | |
| 2007/0234070 A1 | 10/2007 | Horning et al. | |
| 2007/0250815 A1 | 10/2007 | Bendapudi et al. | |
| 2009/0132419 A1* | 5/2009 | Grammer et al. | 705/50 |
| 2011/0182429 A1* | 7/2011 | Grube et al. | 380/268 |

OTHER PUBLICATIONS

Collberg, Christian et al., "A Taxonomy of Obfuscating Transformations", Technical Report #148, Department of Computer Science, University of Aukland, Jul. 1997.

Drape, Stephen, "Obfuscation of Abstract Data-Types", St. John's College, University of Oxford —Thesis submitted for the degree of Doctor of Philosophy, 2004, 187.

Barbosa, M et al., "Compiler Assisted Eliptic Curve Cryptography", On the Move to Meaningful Internet Systems 2007: CoopIS, DOA, ODBASE, GADA, and IS, vol. 4804/2009, Springer Berlin, 2007, 1785-1802.

C-JUMP, , "http://c-jump.com/CIS77/samples/add_16_bytes.lst", on Aug. 19, 2008. Microsoft (R) Macro Assembler Version 8.00. 50727.762 ., \Source\p01_smallest\add_16_bytes.asm p. 1-1.

Ertaul, Levent et al., "Novel Obfuscation Algorithms for Software Security", Proceedings of the 2005 International Conference on Software Engineering Research and Practice, SERP '05, Las Vegas, Jun. 2005, (7 pages).

J-Y Chen, W. Yang, J. Hung, C. Su and W.C. Hsu, "A Static Binary Translator for Efficient Migration of ARM based Applications," Workshop on Optimizations for DSP and Embedded Systems, 6th Workshop on Optimizations for DSP and Embedded Systems, ODES, Apr. 6, 2008, Boston, Massachusetts, 2008, 10 pages. (Available online at http://www.cis.nctu.edu.tw/~wuuyang/papers/Odes7.pdf, last visited Nov. 30, 2011).

Cullen Linn and Saumya Debray, "Obfuscation of Executable Code to Improve Resistance to Static Disassembly," Proceedings of the 10th ACM conference on Computer and communications security, Oct. 27-30, 2003, Washington, DC, ACM, 2003, 10 pages.

C. Collberg, E. Carter, S. Debray, A. Huntwork, C. Linn and M. Stepp, "Dynamic Path-Based Software Watermarking," Proceedings of the ACM SIGPLAN 2004 Conference on Programming Language Design and Implementation, ACM, May 2004, 10 pages.

Steve Hanov, "Static Analysis of Binary Executables," University of Waterloo, 2009, 9 pages (available online at http://stevehanov.ca/cs842_project.pdf, last visited Nov. 30, 2011).

Alon, N. et al., "Finding and Counting Given Length Cycles", Algorithmica (1997) Springer-Verlag New York Inc., Received Oct. 18, 1994, Revised May 5, 1995, pp. 209-223.

Aucsmith, David, "Tamper Resistant Software: An Implementation", Information Hiding Lecture Note if Computer Science, vol. 1174, 1996, pp. 317-333.

Horne, Bill et al., "Dynamic Self-Checking Techniques for Improved Tamper Resistance", STAR Lab, InterTrust Technologies, 2002, Springer, LNCS 2320, pp. 141-159.

\* cited by examiner

SYSTEM AND METHOD FOR OBFUSCATING DATA USING INSTRUCTIONS AS A SOURCE OF PSEUDORANDOM VALUES

CROSS REFERENCE TO RELATED APPLICATIONS

This application claims the benefit of U.S. Provisional Patent Application No. 61/549,700, entitled "SYSTEM AND METHOD FOR OBFUSCATING DATA USING INSTRUCTIONS AS A SOURCE OF PSEUDORANDOM VALUES", filed on Oct. 20, 2011, and which is hereby expressly incorporated herein by reference in its entirety.

BACKGROUND

1. Technical Field

The present disclosure relates to data obfuscation and more specifically to obfuscating a data portion of an executable file using an instruction portion as a source of entropy, or pseudorandom values. In other words, this disclosure uses raw computer instructions to verifiably alter data representations, to mitigate static and dynamic reverse engineering attacks.

2. Introduction

Reverse engineering of software is the process of analyzing or disassembling a compiled computer program to determine functionality including how software performs digital rights management or applies cryptography to protect copyrighted content. Reverse engineering can be performed statically on an executable file or dynamically during execution of the file. Reverse engineers use different methods such as performing a hexdump of compiled computer code to view bytes and translating bits into low level instructions with a disassembler. Certain obfuscation and encryption approaches can hamper reverse engineers from accomplishing their goals. Obfuscation is the process of masking data and can afford some level of data protection. Encryption is the process of protecting data using a secret key and an encryption algorithm and is generally utilized for higher levels of security.

An executable file is in a format that a computer can directly execute. Many common executable file formats contain a data section and a text section. The text section stores instructions or control flow information. Control flow indicates to a computer what to execute next, and often processes or otherwise operates on information stored in the data section. The data section can store keys, images, constants, variables, strings, and so forth. Thus, in order to reverse engineer an executable file, library, or process, an adversary typically must understand the text section as well as the data section.

Because all computers store data as a binary representation, typically using standard encodings such as ASCII, Unicode, and so forth, an attacker can usually rely on standard and well-known approaches for interpreting the data section. Thus, hiding the data section and/or the text section can be an effective way to thwart attackers from determining software functionality.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for obfuscating and de-obfuscating data using instructions as a source of pseudorandom values. A system configured to de-obfuscate data using instructions as a source of pseudorandom values receives an executable file containing a text section and a data section. The text section includes instructions and the data section includes obfuscated data. The system retrieves a mask key containing at least one instruction from the text section based on a memory location of a masked data segment of the data section. The address of the mask key is determined by applying a hash function to the memory location of the masked data segment. The hash function can be known in advance, and can correspond to a function used to obfuscate the data section. Then the system applies the mask key to the masked data segment to yield an unmasked data segment and performs an operation on the unmasked data segment such as a read operation or mathematical operation. The application of the mask key to the masked data segment can be a logical exclusive-or operation or another operation such as addition.

A system configured to obfuscate data using instructions as a source of pseudorandom values receives instructions and data and compiles the instructions and the data into an executable file having a text section and a data section. The text section includes instructions and the data section includes data segments. Usually, the text section is not modified after compilation, but the text section can include a reserved region within which instructions can be modified after compilation. Instructions used to obfuscate data are taken from outside of the reserved region in the text section. The system obfuscates the data section iteratively for each data segment in the data section by generating a hash of an address for a respective data segment, and based on the hash, identifying a corresponding address in the text section that includes at least one instruction. The hash is generated by applying a hash function to the address for the respective data segment. The system retrieves a mask key from the corresponding address and applies the mask key to the respective data segment, yielding a masked data segment. The corresponding address in the text section can be identified from a subset of non-repetitive portions of the text section to increase entropy in the mask key. The operation applied to the mask key and a respective data segment can be a logical exclusive-or or another operation such as addition. For mathematical operations, the data segment and the mask key can be interpreted as integers prior to the operation. In one embodiment, the text section and the data section are located in separate executable files. The data in a first executable file can be obfuscated utilizing the instructions stored in the text section of a second executable file. In another embodiment, array elements can be obfuscated during execution of the executable file to protect elements modified after compilation.

The system can verify the integrity of obfuscated data without exposing the data in an unprotected state by utilizing multiple mask keys. The system can apply a second mask key to a masked data segment masked by a first mask key to yield a first result protected by both the first mask key and the second mask key. Then the system can apply the first mask key to the first result to yield a second result protected by the second mask key and apply the second mask key to an expected unmasked data value to yield a third result. The system can verify the integrity of the masked data segment if the second result is the same as the third result. If the second result is not the same as the third result, the masked data segment is not considered valid. This process verifies the integrity of the masked data segment without revealing the data segment in an unprotected state using mask keys based on instructions in a text section of an executable file.

The approaches disclosed herein protect data, and uses the control flow instructions as not only a mechanism to execute a program, but also as a key to understanding the data section by encoding the data using the instructions.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Several variations shall be discussed herein as the various embodiments are set forth. The disclosure now turns to FIG. 1.

Figure 1:
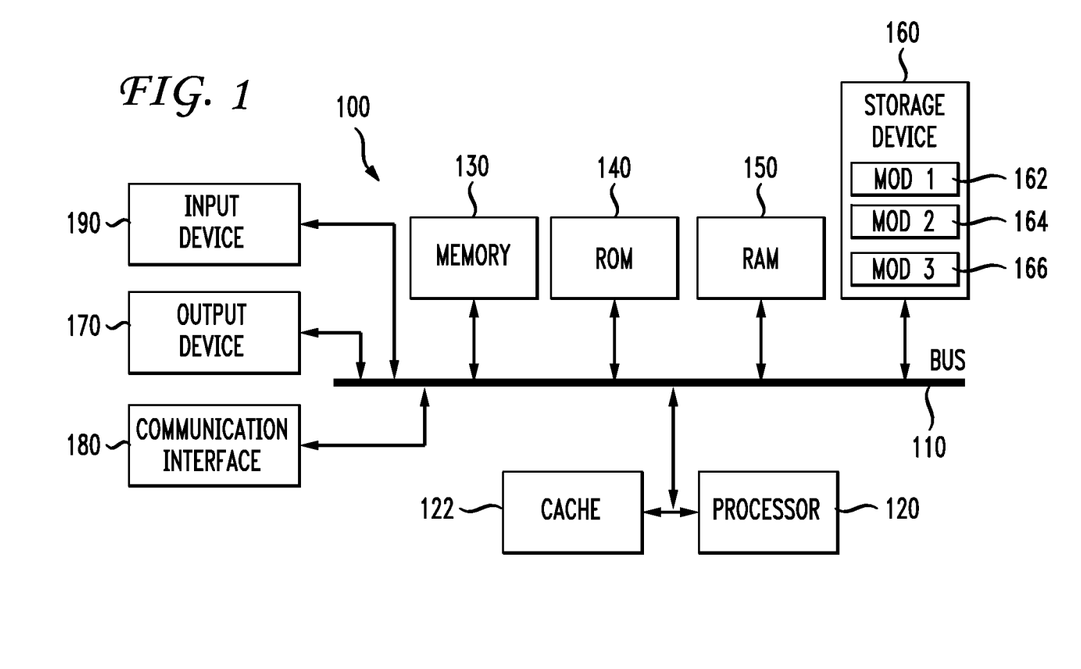
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Having disclosed a basic computing device which can be used to practice the approaches set forth herein, the disclosure turns to a discussion of obfuscation. Obfuscation is a technique that masks data such that the data is harder to understand and is used to thwart or slow down reverse engineers from analyzing and exploiting computer programs. One way to combat reverse engineering attacks is to change the representation of the data; use the bits to represent a different space. One naïve way to perform this shift in data representation is to add a fixed constant to all data. With this approach, the computer does not operate in the space base two integers. Rather, the computer operates in the space base $2+x \% 2^n$ for an integer of length n and a masking constant x. Instructions can similarly be transformed to equivalent operations in the transformed space. For example, the instruction, $$z=a+b$$

becomes, $$z=a-ma+b-mb+mz$$

$$=a+b-(ma+mb-mz)$$

where ma represents the mask of a, mb represents the mask of b and mz represents the mask of z. This technique successfully hides the original value stored in the variable a from plain view by a reverse engineer. To additionally verify that data is hidden during the execution of a program, a known value can be selected for the mask.

A traditional approach to obfuscation utilizes a hash table stored in memory with values or mask keys from which a value is chosen to protect a data segment. A hash table uses a hash function to map keys to values. The drawback to this approach is that it requires additional storage space in memory for the table. A more efficient approach described herein alters the representation of data by obfuscating data in the data section of an executable file with instructions from the text section of an executable file. This approach does not require additional storage in memory for a table used exclusively for obfuscation, but rather draws mask keys for obfuscation to change data representation from actual program instructions in the text section and encodes the data section using the text section.

Figure 2:
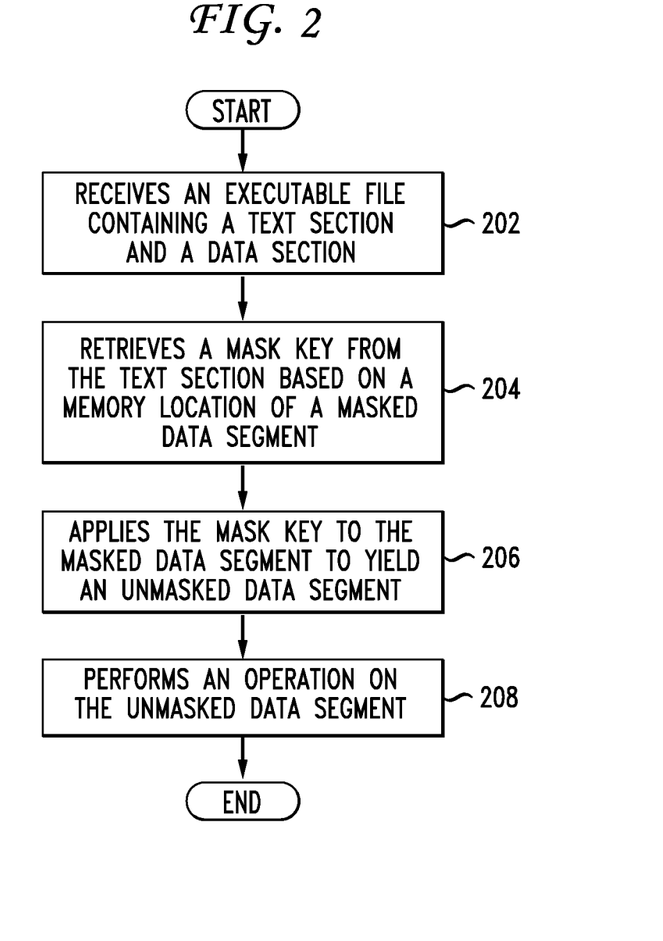
FIG. 2 illustrates data de-obfuscation using instructions as a source of pseudorandom values.

Having disclosed some basic system components and concepts, the disclosure now turns to the exemplary method embodiment shown in FIG. 2. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

FIG. 2 illustrates de-obfuscating data using instructions as a source of pseudorandom values. The system 100 receives an executable file containing a text section and a data section (202). The text section includes instructions and the data section includes obfuscated data. The executable file can be stored in the system 100 or can be transmitted over a network from another computer or device such as a smartphone, laptop, PDA, etc. The system 100 retrieves a mask key from the text section based on a memory location of a masked data segment (204). The mask key is stored in a memory location indexed by the result of applying a hash function to the memory location of the masked data segment, and can include a partial or complete instruction or can contain a set of instructions. One or more instructions can be manipulated to determine the mask key, such as applying logical or mathematical operations to the instructions. Instead of storing a separate hash table in memory for the exclusive purpose of providing mask keys, the system 100 uses the text section of the executable file essentially as a complete or partial replacement or substitute for the separate hash table to provide mask keys, encoding the data with instructions from the text section. Thus, significant space savings can be achieved by repurposing the instructions to also serve as the hash table. The system 100 applies the mask key to the masked data segment to yield an unmasked data segment (206) and performs an operation on the unmasked data segment (208). The system 100 can perform a logical exclusive-or of the mask key and the masked data segment to determine the unmasked data segment or another operation such as addition. The mask key can be interpreted as an integer prior to the addition or any mathematical operation applied to the mask key and the masked data segment. Any operation can be performed on the unmasked data segment such as a read, or mathematical operation such as addition or subtraction. In one embodiment, the data section and the text section are located in separate executable files. The text section of a first file encodes the data section of a second file.

Figure 3:
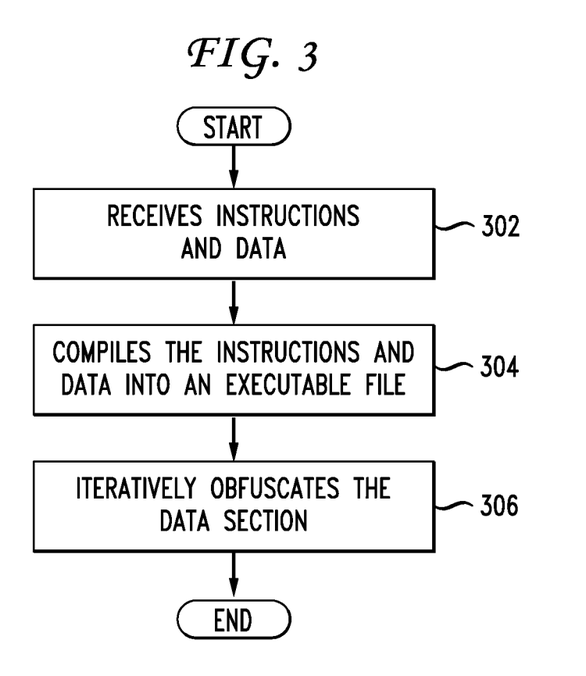
FIG. 3 illustrates data obfuscation using instructions as a source of pseudorandom values.
Figure 4:
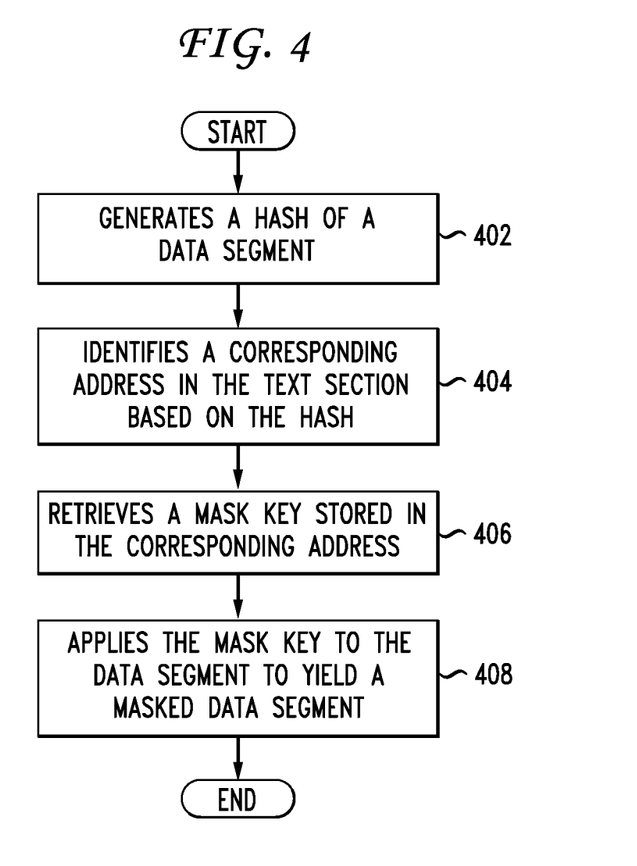
FIG. 4 illustrates iterative data obfuscation.

FIG. 3 illustrates obfuscating data using instructions as a source of pseudorandom values and FIG. 4 illustrates iteratively obfuscating a data section in an executable file. The system 100 receives instructions and data (302) and compiles the instructions and the data into an executable file having a text section containing instructions and a data section having data segments (304). A source file containing instructions and data for obfuscating can be stored in the system or can be transmitted over a network via a smartphone, laptop, PDA, etc. to the system 100. The system 100 iteratively obfuscates the data section (306) by processing the data in segments. In some use cases, the data section remains unchanged during execution, but in other use cases, at least part of the data section changes from time to time. In order to accommodate these changes, the system 100 can optionally obfuscate data on the fly when writing or storing new values in the data section or when updating existing values in the data section.

For each data segment in the data section, the system 100 generates a hash of a data segment (402) and identifies a corresponding address in the text section based on the hash (404). The hash is generated by applying a hash function to the data segment. For example, the hash function can use the address as input and perform a modulus operation using the address as the dividend and the size of the text section as the divisor. The hash can change for the same input between subsequent executions of the same program, but stays consistent for the duration of a single execution. Any hash function is acceptable and this example should not be limiting in any way. In another embodiment, the hash can be restricted to a specific subset of the text section of an executable file. For example, for performance reasons the hash can be restricted to a subset of the text section that is a size of a power of two. The performance gain is based on increasing the efficiency of the division operation. Typically, performing a modulus operation is accomplished via a series of divides, which are computationally expensive operations. An equivalent operation that can significantly increase performance for values that are a power of two is performing a logical and operation with the number of desired ones. Similarly, in order to avoid repetitive portions of the instructions, the hash can be directed to specific desired, non-repetitive portions. A larger hash value can provide an enhanced level of protection. The system 100 can balance performance and protection, by altering the size of the hash value and the corresponding mod operation. One way to balance these competing interests is to select the largest $2^i$ value that fits within the size of the text section. Additionally, different hashes with potentially different sizes can operate on different portions of the same instruction section, for example they can be completely separate, contiguous and/or overlapping).

In one variation, after determining the largest $2^i$ size that can fit within the text section, the system 100 determines an offset value. The offset value indicates from which position within the text section the system begins using as the first position of the hash. In this way, by using different offsets, different overlapping portions of the same text section can provide multiple different hash tables and different results.

After the system 100 generates the hash, the system 100 retrieves a mask key stored in the corresponding address (406). The mask key can be a partial or complete instruction or can contain a set of instructions. Additionally, the system 100 can manipulate one or more instructions to generate the mask key. Lastly, the system 100 applies the mask key to the data segment to yield a masked data segment (408). Applying the mask key to the data segment can be performed using a logical exclusive-or operation or another operation such as addition. The system 100 can cast the instruction to the same type as the data segment it is applied to. For example, if the data segment is a four byte i32 integer, the instruction is cast to that type. In one embodiment, the text section of the executable file is not modified after compilation because mask keys used for obfuscating and de-obfuscating are derived from instructions in the text section. In another embodiment, the text section includes a reserved region within which instructions can be modified after compilation. The corresponding address can be outside of the reserved region which contains instructions that can change such that the mask key is drawn from instructions that do not change. For higher entropy, the corresponding address can be identified from a subset of non-repetitive portions of the text section. The higher the entropy that a mask key contains, the more random the masked data segment appears, thus making the reverse engineer's goal of locating sensitive data more difficult.

Additionally, array elements in the data section of an executable file can be obfuscated during execution of the executable file. Prior to compilation, an array can be initialized. However array elements populated during program execution can be obfuscated after compilation because the array elements are not known at compilation time. Once a program is compiled, the bytes in the text section are determined. There are certain points throughout the execution of the program where data is guaranteed to have a specific value. For example, the data can have a guaranteed value when an array is initialized. Because the bytes in the text section are determined once a program is compiled, the instruction (or mask key) at a particular location in the text section is determined. At these points, obfuscated data can be compared with expected data to detect tampering by a reverse engineer. If an adversary tampered with the text section by inserting a break point, for example, the obfuscated data is not validated because the instruction has changed.

Figure 5:
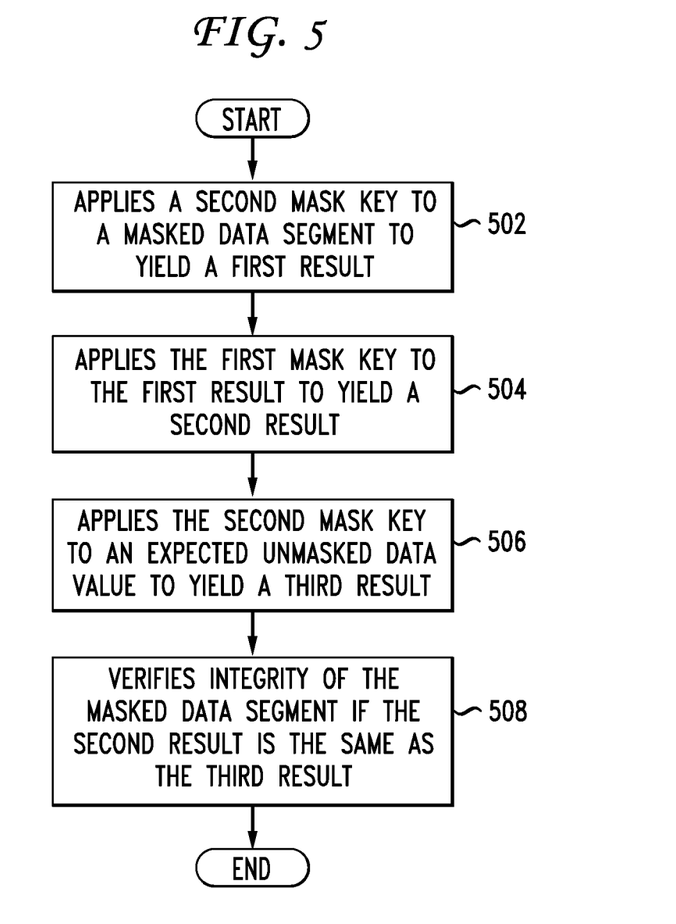
FIG. 5 illustrates an exemplary integrity verification method embodiment.
Figure 6:
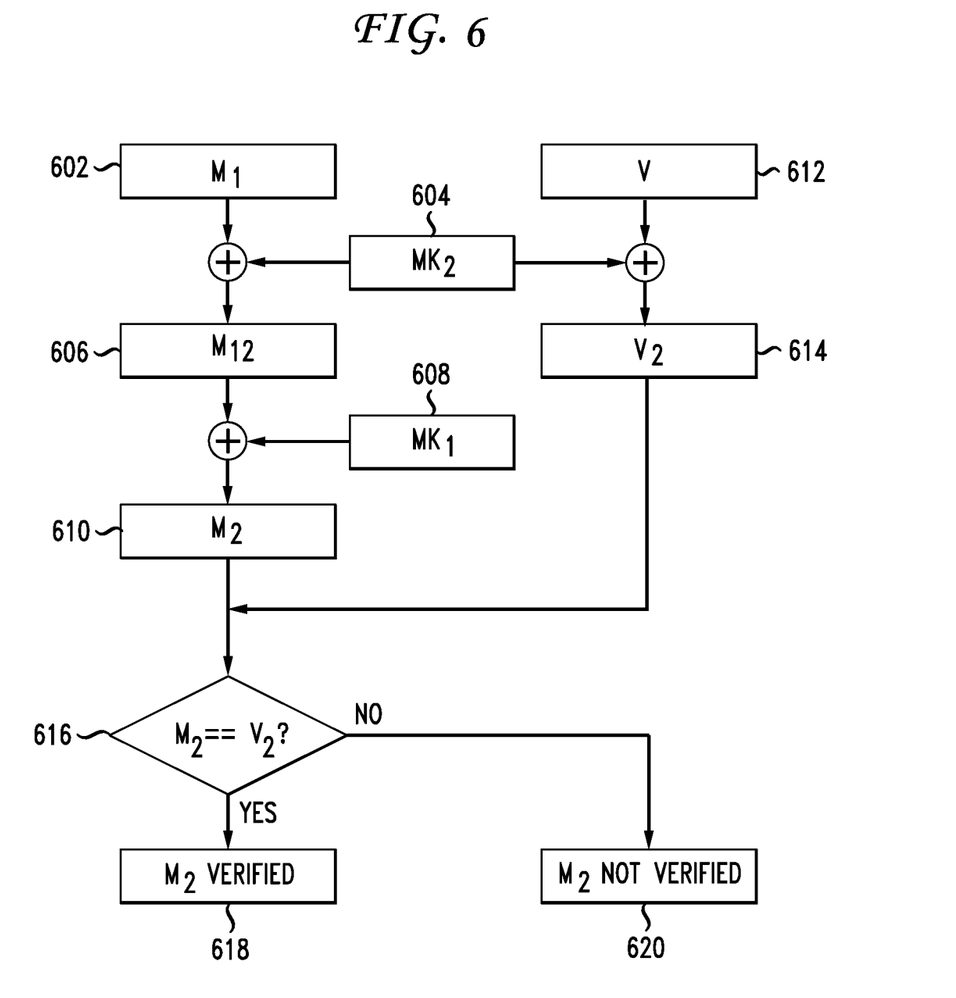
FIG. 6 illustrates an exemplary integrity verification system embodiment.

FIG. 5 and FIG. 6 illustrate verifying integrity of a masked data segment. For verification that masked data has not been altered, the system 100 can apply a second mask key to a masked data segment masked by a first mask key to yield a first result 502 protected by a first mask key and a second mask key. The mask keys for integrity verification include instructions retrieved from a text section determined by hashed data locations in the data section. The system 100 applies the first mask key to the first result to yield a second result 504 protected by the second mask key. Because the second mask key is applied before removing the first mask key, the data segment is always masked by at least one key. The second mask key is applied to an expected unmasked data value to yield a third result 506 and the system verifies the integrity of the masked data segment if the second result is the same as the third result 508.

For example, integrity verification of the masked data segment $M_1$ 602 is performed by first performing a logical exclusive-or with $MK_2$ 604, a second mask key that yields a first result $M_{12}$ 606. The first result $M_{12}$ is masked by performing a logical exclusive-or with $MK_1$ 608 to yield a second result $M_2$ 610. The expected unmasked data value V 612 is masked by performing a logical exclusive-or with $MK_2$ 604 to yield a third result $V_2$ 614. If $M_2$ equals $V_2$ 616 the system verifies integrity 618 of the original masked data segment $M_2$, if they are unequal the system does not verify integrity of $M_2$ 620. Verifying integrity of a masked data segment is performed in such a way that the unmasked data segment is never revealed. The mask keys used for verification can be drawn from the data section in one executable file or can be stored in text sections in separate executable files. Integrity verification can be performed using two or more mask keys such that the data segment is not revealed in an unmasked state.

Figure 7:
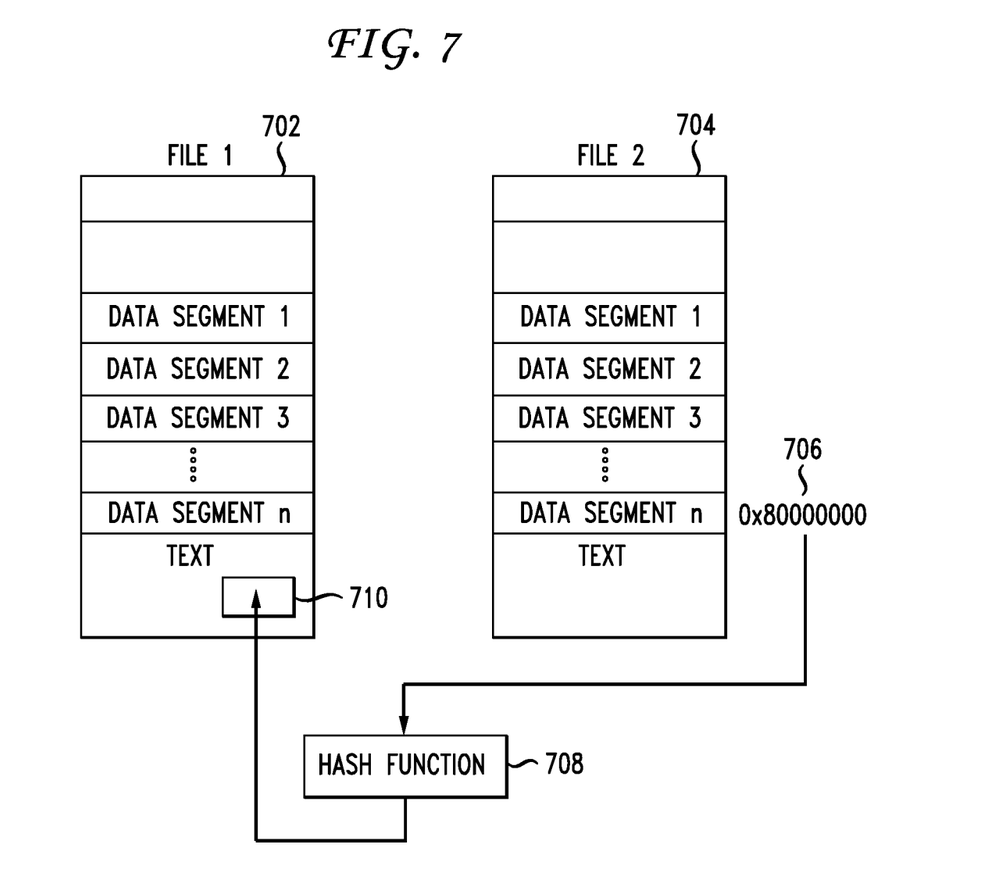
FIG. 7 illustrates mask key retrieval utilizing two executable files.

FIG. 7 illustrates mask key retrieval utilizing separate executable files. Separate executable files, file 1 702 and file 2 704 each include a data section containing data and a text section containing instructions. The memory address 0x80000000 storing data segment n in file 2 706 is used as input to a hash function 708. The memory location of the mask key stored in the text section of file 1 710 is determined by the output of the hash function 708. Thus, the system 100 obfuscates data segments in a first file utilizing the instructions in a second file. Similarly, data segments in file 1 702 can be protected by instructions in the text section of file 2 704.

In some specific implementations, the text section of an executable file can change, such as self-modifying code. A change to any aspect of the text section can impact the hash table and the corresponding obfuscation. In order to accommodate self-modifying code or other changes to the text section, the system can first detect that a change is requested, or attempted, planned or otherwise to be expected. In response to detecting the change, the system can first de-obfuscate the affection portion(s) of the data section using the unmodified text section. Then the system can make the change to the text section to yield a modified text section. After the change to the text section, the system can re-obfuscate the affected portion(s) of the data section using the modified text section. In one aspect, the system performs these operations in memory, but the same or equivalent operations can occur at a file level on a storage device such as a hard disk drive or solid state drive.

The obfuscation approach disclosed herein changes the representation of data such that it is difficult for an adversary to understand. The representation is changed using the text section of an executable file as the key. This approach intertwines the text section and the data section of the executable file. The representation of data is based on a particular instruction at a particular location and the representation can change based on the instruction set for a particular processor architecture or instruction set, for example ARM, x86, x86-64, Cell, PowerPC, IA-64, SPARC, and so forth. The representation of data can even change between related micro-architectures, given that at least one instruction that is different between the micro-architectures is used in the text section. For example, an ARM Cortex A8 CPU may use an instruction set that is compatible with an ARM Cortex A9 CPU, but the same instructions compiled for the A9 CPU may lead to a different set of instructions or arrangement of instructions in the text section. Using the instructions as the key prevents an adversary from reverse engineering a program only once for multiple architectures. Any successful reverse engineering attempt on one platform does not provide access to other platforms, due to differences in CPU architecture, instruction sets, and so forth. Thus, an attacker must reverse engineer the same program separately for each different platform or architecture.

Performing obfuscation utilizing instructions in the text section of an executable file can be combined with any other data hiding technique such as other obfuscation methods or encryption. For example, an executable file can be obfuscated utilizing the method disclosed herein and subsequently encrypted for transmission over a network. These principles can be combined with obfuscation, encryption and/or any other compatible data hiding technique.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
    receiving a first executable file containing a text section and a second executable file containing a data section, wherein the text section comprises instructions, and wherein the data section comprises obfuscated data;
    deriving a mask key comprising at least one instruction from the text section in the first executable file based on a memory location of a masked data segment of the data section in the second executable file;
    applying the mask key to the masked data segment to yield an unmasked data segment; and
    performing an operation on the unmasked data segment.

2. The method of claim 1, wherein the mask key is stored in a memory location indexed by the result of applying a hash function to the memory location of the masked data segment.

3. The method of claim 1, wherein the value of the unmasked data segment is determined by applying a logical exclusive-or operation to the mask key and the masked data segment.

4. The method of claim 1, wherein the value of the unmasked data segment is determined by performing an addition of the mask key and the masked data segment.

5. The method of claim 4, wherein the mask key is interpreted as an integer.

6. A method comprising:
receiving instructions and data;
compiling the instructions and the data into an executable file having a text section and a data section wherein the text section comprises instructions and wherein the data section comprises data segments;
obfuscating the data section by iteratively performing, for each of a plurality of data segments in the data section, steps comprising:
generating a hash of an address for a respective data segment;
based on the hash, identifying a corresponding address in the text section comprising at least one instruction;
deriving a mask key from the at least one instruction stored at the corresponding address; and
applying the mask key to the respective data segment to yield a masked data segment.

7. The method of claim 6, wherein the hash is generated by applying a hash function to the address of the respective data segment.

8. The method of claim 6, wherein the text section is not modified after compilation.

9. The method of claim 6, wherein the text section includes a reserved region within which instructions are modified after compilation.

10. The method of claim 9, wherein the corresponding address is outside of the reserved region.

11. The method of claim 6, wherein the corresponding address is identified from a subset of non-repetitive portions of the text section.

12. The method of claim 6, wherein the masked data segment is generated by applying a logical exclusive or operation to the mask key and the respective data segment.

13. The method of claim 6, wherein the masked data segment is generated by performing an addition of the mask key to the respective data segment.

14. The method of claim 13, wherein the mask key is interpreted as an integer prior to the addition.

15. The method of claim 6, wherein array elements in the data section are obfuscated during execution of the executable file.

16. A system comprising:
a processor;
a memory storing instructions for controlling the processor to perform steps comprising:
applying a second mask key to a masked data segment masked by a first mask key to yield a first result;
applying the first mask key to the first result to yield a second result;
applying the second mask key to an expected unmasked data value to yield a third result; and
verifying integrity of the masked data segment if the second result is the same as the third result,
wherein the first mask key and the second mask key are instructions in a text section stored in memory locations indexed by hashed data locations.

17. The system of claim 16, wherein the first mask key and the second mask key are instructions stored in text sections in separate executable files.

18. The system of claim 16, wherein the masked data segment is always protected by at least one mask key.

19. A non-transitory computer-readable medium storing instructions which, when executed by a computing device, cause the computing device to perform steps comprising:
receiving a first executable file containing a text section and a second executable file having a data section, wherein the text section comprises instructions, and wherein the data section comprises obfuscated data;
deriving a mask key comprising at least one instruction from the text section in the first executable file based on a memory location of a masked data segment of the data section in the second executable file;
applying the mask key to the masked data segment to yield an unmasked data segment; and
performing an operation on the unmasked data segment.

20. The non-transitory computer-readable medium of claim 19, wherein the mask key is stored in a memory location indexed by the result of applying a hash function to the memory location of the masked data segment.

21. The non-transitory computer-readable medium of claim 19, wherein the value of the unmasked data segment is determined by applying a logical exclusive-or operation to the mask key and the masked data segment.

\* \* \* \* \*